(12) United States Patent
Lee et al.

(10) Patent No.: US 11,284,358 B2
(45) Date of Patent: Mar. 22, 2022

(54) METHOD FOR TRANSMITTING A POWER HEADROOM REPORTING IN WIRELESS COMMUNICATION SYSTEM AND A DEVICE THEREFOR

(71) Applicant: LG Electronics Inc., Seoul (KR)

(72) Inventors: Sunyoung Lee, Seoul (KR); Eunjong Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 16/628,130

(22) PCT Filed: Jul. 4, 2018

(86) PCT No.: PCT/KR2018/007560
§ 371 (c)(1),
(2) Date: Jan. 2, 2020

(87) PCT Pub. No.: WO2019/013485
PCT Pub. Date: Jan. 17, 2019

(65) Prior Publication Data
US 2021/0153142 A1 May 20, 2021

Related U.S. Application Data

(60) Provisional application No. 62/530,304, filed on Jul. 10, 2017.

(51) Int. Cl.
*H04W 52/36* (2009.01)
*H04W 52/24* (2009.01)
(Continued)

(52) U.S. Cl.
CPC ....... *H04W 52/365* (2013.01); *H04W 52/242* (2013.01); *H04W 52/42* (2013.01); *H04W 72/044* (2013.01)

(58) Field of Classification Search
CPC ... H04W 52/365; H04W 52/00; H04W 52/04; H04W 52/30; H04W 52/36
See application file for complete search history.

(56) References Cited

U.S. PATENT DOCUMENTS

2012/0178494 A1  7/2012  Haim et al.
2012/0224552 A1  9/2012  Feuersanger et al.
(Continued)

FOREIGN PATENT DOCUMENTS

WO   WO2015140634   9/2015

OTHER PUBLICATIONS

PCT International Search Report and Written Opinion in International Application No. PCT/KR2018/007560, dated Oct. 2, 2018, 10 pages.

(Continued)

*Primary Examiner* — Robert C Scheibel
(74) *Attorney, Agent, or Firm* — Fish & Richardson P.C.

(57) ABSTRACT

The present invention relates to a wireless communication system. More specifically, the present invention relates to a method and a device for transmitting a power headroom reporting in wireless communication system, the method comprising: calculating multiple Power Headroom (PH) values per an active cell; selecting one PH value among the multiple PH values for setting a value of a PH field of a corresponding cell to the selected PH value; generating a Power Headroom Reporting (PHR) Medium Access Control (MAC) Control Element (CE) including the PH field set to the selected PH value; and transmitting a MAC Protocol Data Unit (PDU) including the generated PHR MAC CE to a network.

6 Claims, 16 Drawing Sheets

(51) Int. Cl.
*H04W 52/42* (2009.01)
*H04W 72/04* (2009.01)

(56) References Cited

U.S. PATENT DOCUMENTS

| | | |
|---|---|---|
| 2013/0044831 A1 | 2/2013 | Narasimha et al. |
| 2016/0150485 A1 | 5/2016 | Yi et al. |
| 2017/0195998 A1 | 7/2017 | Zhang et al. |
| 2018/0115957 A1* | 4/2018 | Lin .................... H04W 52/146 |
| 2018/0132197 A1* | 5/2018 | Lin ...................... H04W 52/42 |
| 2018/0324715 A1* | 11/2018 | Ryoo ................... H04W 76/18 |
| 2018/0368081 A1* | 12/2018 | Akkarakaran ...... H04W 52/242 |
| 2019/0223117 A1* | 7/2019 | Chai ................... H04W 52/367 |
| 2020/0022094 A1* | 1/2020 | You .................. H04W 72/0413 |
| 2020/0084735 A1* | 3/2020 | Cheng ................ H04W 52/146 |
| 2020/0145987 A1* | 5/2020 | Ji ......................... H04W 72/04 |

OTHER PUBLICATIONS

Huawei, HiSilicon, "Considerations on PHR," R2-1704612, 3GPP TSG-RAN WG2#98, Hangzhou, China, dated May 15-19, 2017, 5 pages.
InterDigital Inc., "Power Headroom Reporting for NR," R2-1704915, 3GPP TSG-RAN WG2 #98, Hangzhou, P.R. China, dated May 15-19, 2017, 2 pages.
EP extended European search report, in European Appln. No. 18831584.0, dated Nov. 17, 2020, 9 pages.

\* cited by examiner ( a ) Control-Plane Protocol Stack ( b ) User-Plane Protocol Stack (a) Control-Plane Protocol Stack (b) User-Plane Protocol Stack

Figure 7b

| $C_7$ | $C_6$ | $C_5$ | $C_4$ | $C_3$ | $C_2$ | $C_1$ | R |
|---|---|---|---|---|---|---|---|
| P | V | \multicolumn{6}{l|}{PH (Type 2, PCell)} |
| R | R | \multicolumn{6}{l|}{$P_{CMAX,c}$ 1} |
| P | V | \multicolumn{6}{l|}{PH (Type 1, PCell)} |
| R | R | \multicolumn{6}{l|}{$P_{CMAX,c}$ 2} |
| P | V | \multicolumn{6}{l|}{PH (Type x, SCell 1)} |
| R | R | \multicolumn{6}{l|}{$P_{CMAX,c}$ 3} |

...

| P | V | PH (Type x, SCell n) |
|---|---|---|
| R | R | $P_{CMAX,c}$ m |

Figure 7c

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | \multicolumn{6}{l|}{PH (Type 2, PCell)} |
| R | R | \multicolumn{6}{l|}{$P_{CMAX,c}$ 1} |
| P | V | \multicolumn{6}{l|}{PH (Type 1, PCell)} |
| R | R | \multicolumn{6}{l|}{$P_{CMAX,c}$ 2} |
| P | V | \multicolumn{6}{l|}{PH (Type x, SCell 1)} |
| R | R | \multicolumn{6}{l|}{$P_{CMAX,c}$ 3} |

...

| P | V | PH (Type x, SCell n) |
|---|---|---|
| R | R | $P_{CMAX,c}$ m |

Figure 7d

| R | R | PH (Type X, PCell) |
|---|---|---|
| R | R | $P_{CMAX,c}$ |

Figure 7e

| $C_7$ | $C_6$ | $C_5$ | $C_4$ | $C_3$ | $C_2$ | $C_1$ | R |
|---|---|---|---|---|---|---|---|
| P | V | \multicolumn{6}{c} PH (Type 2, PCell) |
| R | R | \multicolumn{6}{c} $P_{CMAX,c}$ 1 |
| P | V | \multicolumn{6}{c} PH (Type 2, PSCell or PUCCH SCell) |
| R | R | \multicolumn{6}{c} $P_{CMAX,c}$ 2 |
| P | V | \multicolumn{6}{c} PH (Type X, PCell) |
| R | R | \multicolumn{6}{c} $P_{CMAX,c}$ 3 |
| P | V | \multicolumn{6}{c} PH (Type X, SCell 1) |
| R | R | \multicolumn{6}{c} $P_{CMAX,c}$ 4 |

...

| P | V | PH (Type X, SCell n) |
|---|---|---|
| R | R | $P_{CMAX,c}$ m |

Figure 7f

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, PCell) | | | | | |
| R | R | $P_{CMAX,c}$ 1 | | | | | |
| P | V | PH (Type 2, PSCell or PUCCH SCell) | | | | | |
| R | R | $P_{CMAX,c}$ 2 | | | | | |
| P | V | PH (Type X, PCell) | | | | | |
| R | R | $P_{CMAX,c}$ 3 | | | | | |
| P | V | PH (Type X, SCell 1) | | | | | |
| R | R | $P_{CMAX,c}$ 4 | | | | | |

...

| | | |
|---|---|---|
| P | V | PH (Type X, SCell n) |
| R | R | $P_{CMAX,c}$ m |

Figure 11a

| 0 | 0 | 0 | 0 | 0 | 0 | 1 | R |
|---|---|---|---|---|---|---|---|
| P | V | \multicolumn{6}{c}{PH (Type 2, PCell)} |
| R | R | \multicolumn{6}{c}{$P_{CMAX,c}$ 1} |
| P | V | \multicolumn{6}{c}{PH (Type X, PCell)} |
| R | R | \multicolumn{6}{c}{$P_{CMAX,c}$ 2} |
| P | V | \multicolumn{6}{c}{PH5 (Type 1, Scell 1)} |
| R | R | \multicolumn{6}{c}{$P_{CMAX,c}$ 3} |

Figure 11b

| 0 | 0 | 0 | 0 | 0 | 1 | 0 | R |
|---|---|---|---|---|---|---|---|
| P | V | \multicolumn{6}{c}{PH (Type 2, PCell)} |
| R | R | \multicolumn{6}{c}{$P_{CMAX,c}$ 1} |
| P | V | \multicolumn{6}{c}{PH (Type X, PCell)} |
| R | R | \multicolumn{6}{c}{$P_{CMAX,c}$ 2} |
| P | V | \multicolumn{6}{c}{PH1 (Type 1, Scell 2)} |
| R | R | \multicolumn{6}{c}{$P_{CMAX,c}$ 3} |

METHOD FOR TRANSMITTING A POWER HEADROOM REPORTING IN WIRELESS COMMUNICATION SYSTEM AND A DEVICE THEREFOR

CROSS-REFERENCE TO RELATED APPLICATIONS

This application is a National Stage application under 35 U.S.C. § 371 of International Application No. PCT/KR2018/007560, filed on Jul. 4, 2018, which claims the benefit of U.S. Provisional Application No. 62/530,304, filed on Jul. 10, 2017. The disclosures of the prior applications are incorporated by reference in their entirety.

TECHNICAL FIELD

The present invention relates to a wireless communication system and, more particularly, to a method for transmitting a power headroom reporting in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention devised to solve the problem lies in a method and device for transmitting a power headroom reporting in wireless communication system.

In NR, it will be possible to use high frequency bands up to 100 GHz, for which beam forming is deemed a key technology in order to compensate for a large path-loss. By using multiple antenna arrays, multiple narrow beams with higher antenna gain could cover similar level of cell coverage even on high frequency band. Given that each beam would cover different geological area, each beam may experience different radio condition.

Also, in NR, multiple numerologies is to be used in order to enable flexible scheduling. For example, 30 kHz of subcarrier spacing allows more frequent scheduling within a subframe as the symbol length is decreased to 0.5 ms. Scheduling with different numerologies could be possible in TDM or FDM manner. If different numerologies are used for scheduling based on FDM manner, the radio condition may be different between numerologies.

As each beam/numerology may experience different radio condition, PHR Beam forming and numerologies in NR may have an impact in Power Headroom Reporting (PHR).

In LTE, PHR is used to inform the eNB of power situation of the UE so that the eNB can decide whether to allocate more resources to the UE or not. Simply saying, PH in PHR is set to $P_{cmax,c}(i) - P_{PUSCH,c}(i)$, where $P_{PUSCH,c}(i)$ is determined by several factors, e.g., bandwidth of the PUSCH resource assignment, downlink path loss, path loss compensation factor, and MCS related factor.

In using multiple beams or numerologies, the factors impacting $P_{PUSCH,c}(i)$ may be different for different beams or numerologies. For example, different beams may experience different downlink path loss, or different numerologies may be allocated with different bandwidth of the PUSCH resource assignment.

In this case, for accurate power control, it may be necessary for the UE to report PH for each beam or for each numerology. However, it increases the signalling overhead of PHR as PHR includes PH information for each beam and each numerology. Considering the possible number of beam or numerology, this wouldn't be desirable. Therefore, a new mechanism that allows the network to estimate the UE's power situation in multiple beam/numerology is needed.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

The invention is that a UE transmits PHR including a selected one of multiple PHs for all activated beams of a serving cell, in multi-beam UL transmission.

According to the present invention, since a size of the existing PHR MAC CE does not increase even though the PH can be reported per beam, numerology or carrier, the UE doesn't increase signalling overhead and UE complexity due to the frequent beam change at al. And because the UE can report PH per beam, numerology or carrier, accurate power control is possible by the base station.

Further, according to the present invention, since the existing PHR MAC CE format can be used, the impact of the specification change can be minimized.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIGS. 11a and 11b are examples for transmitting a power headroom reporting in wireless communication system according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
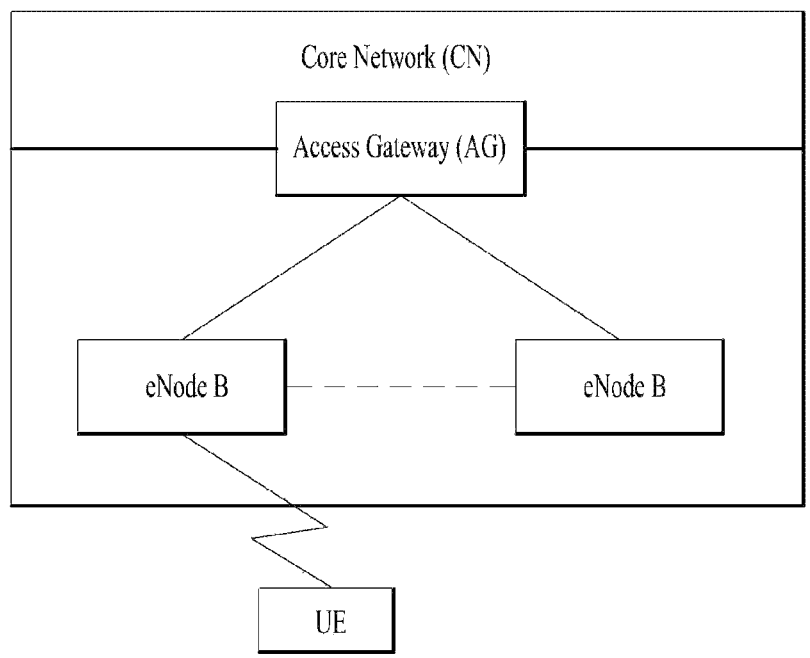
FIG. 1 is a diagram showing a network structure of an Evolved Universal Mobile Telecommunications System (E-UMTS) as an example of a wireless communication system.
Figure 2A:
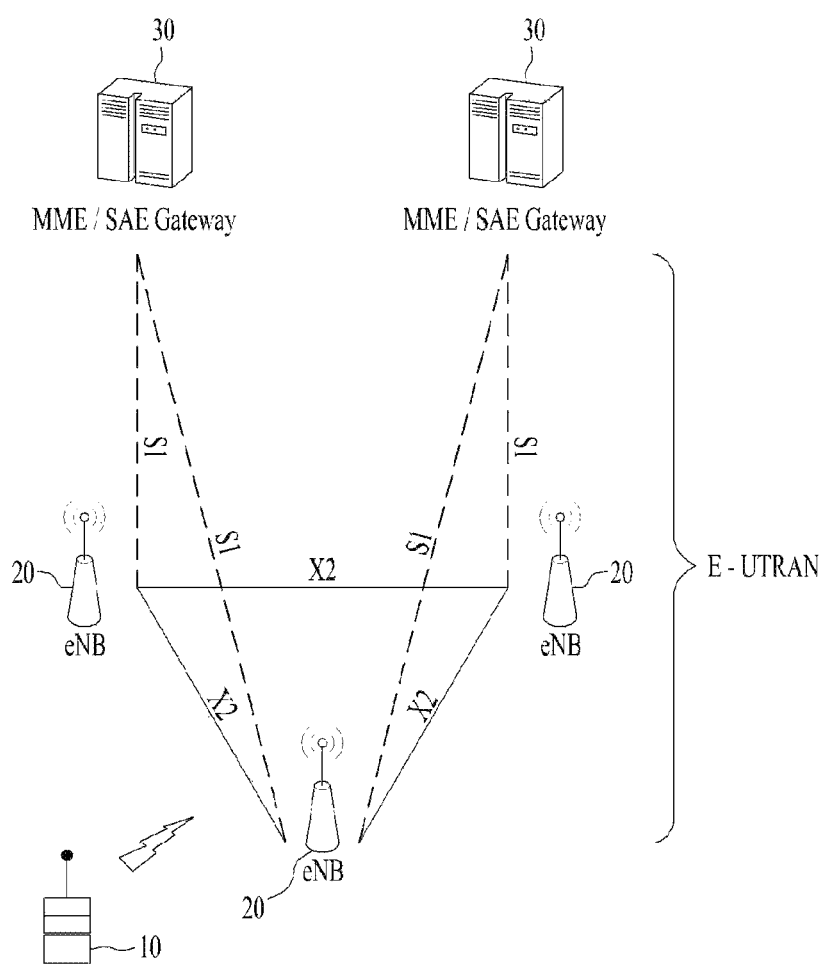
FIG. 2a is a block diagram illustrating network structure of an evolved universal mobile telecommunication system (E-UMTS)

FIG. 2a is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2a, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
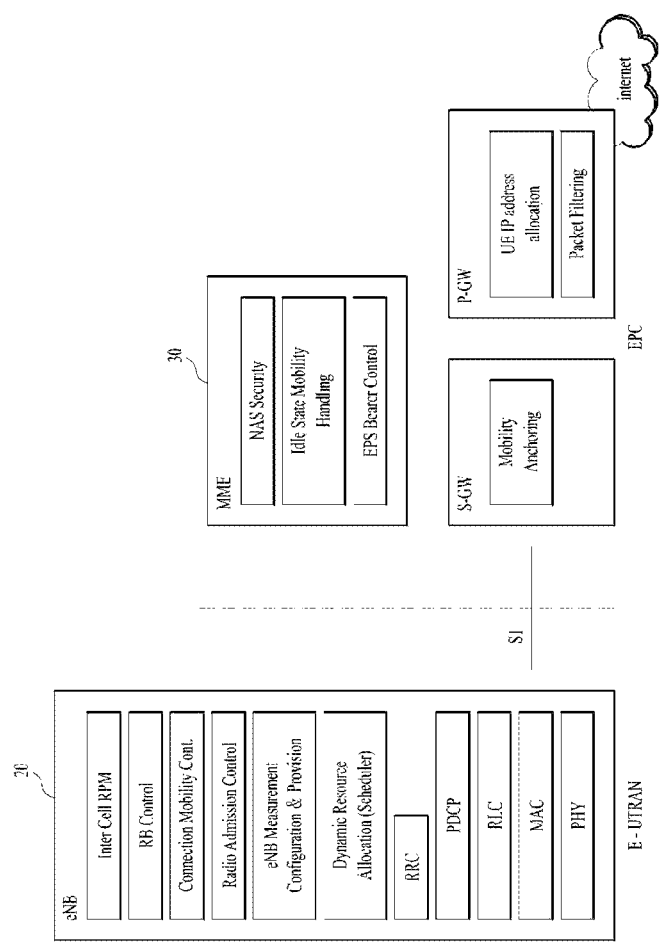
FIG. 2b is a block diagram depicting architecture of a typical E-UTRAN and a typical EPC.

FIG. 2b is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
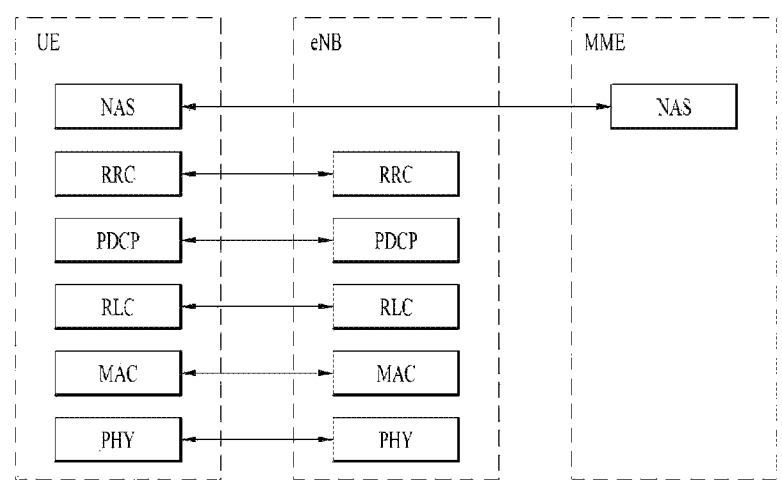
FIG. 3 is a diagram showing a control plane and a user plane of a radio interface protocol between a UE and an E-UTRAN based on a 3rd generation partnership project (3GPP) radio access network standard.
Figure 3:
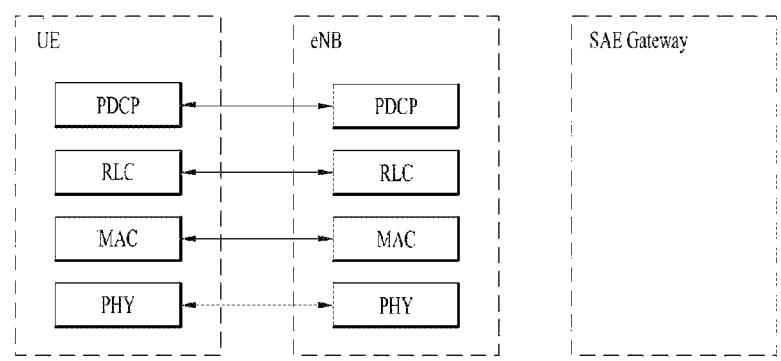

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
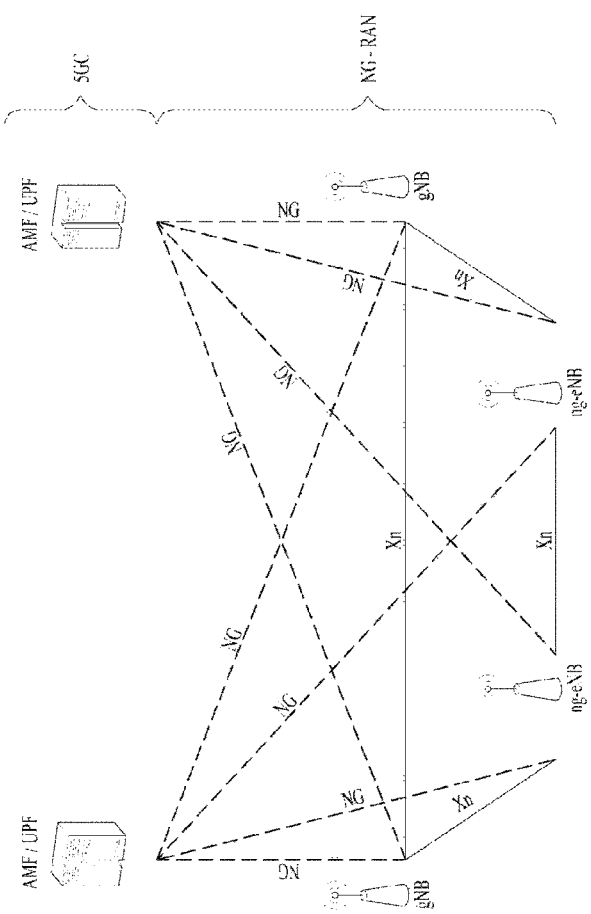
FIG. 4a is a block diagram illustrating network structure of NG Radio Access Network (NG-RAN) architecture.
Figure 4B:
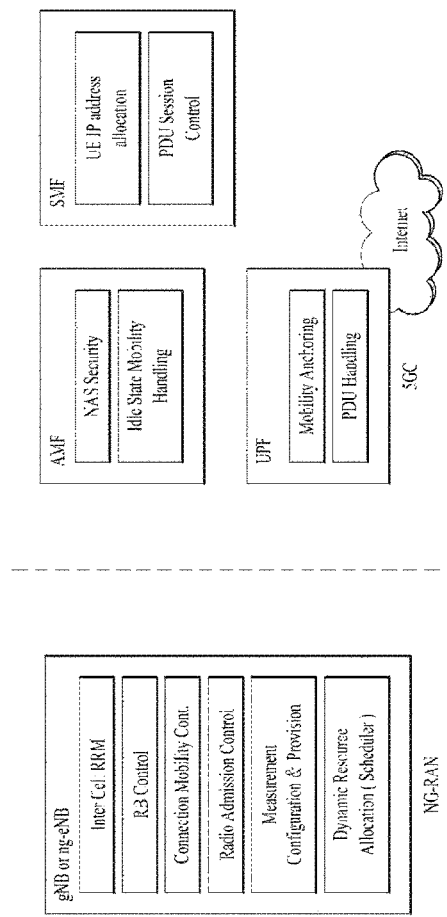
FIG. 4b is a block diagram depicting architecture of functional Split between NG-RAN and 5G Core Network (5GC)

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
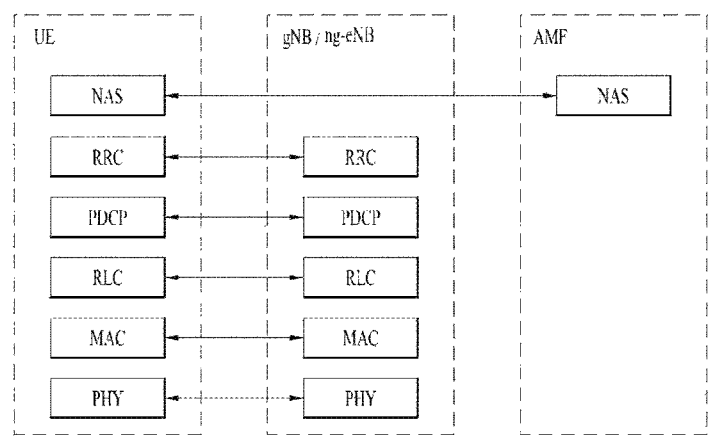
FIG. 5 is a diagram showing a control plane and a user plane of a radio interface protocol between a UE and a NG-RAN based on a 3rd generation partnership project (3GPP) radio access network standard.
Figure 5:
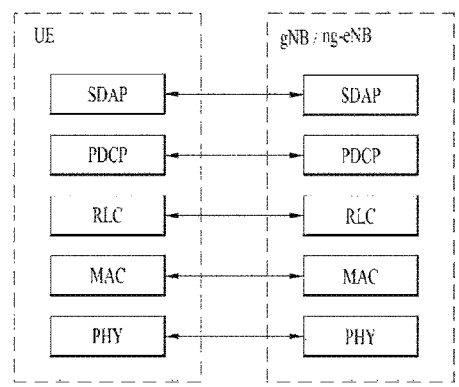

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
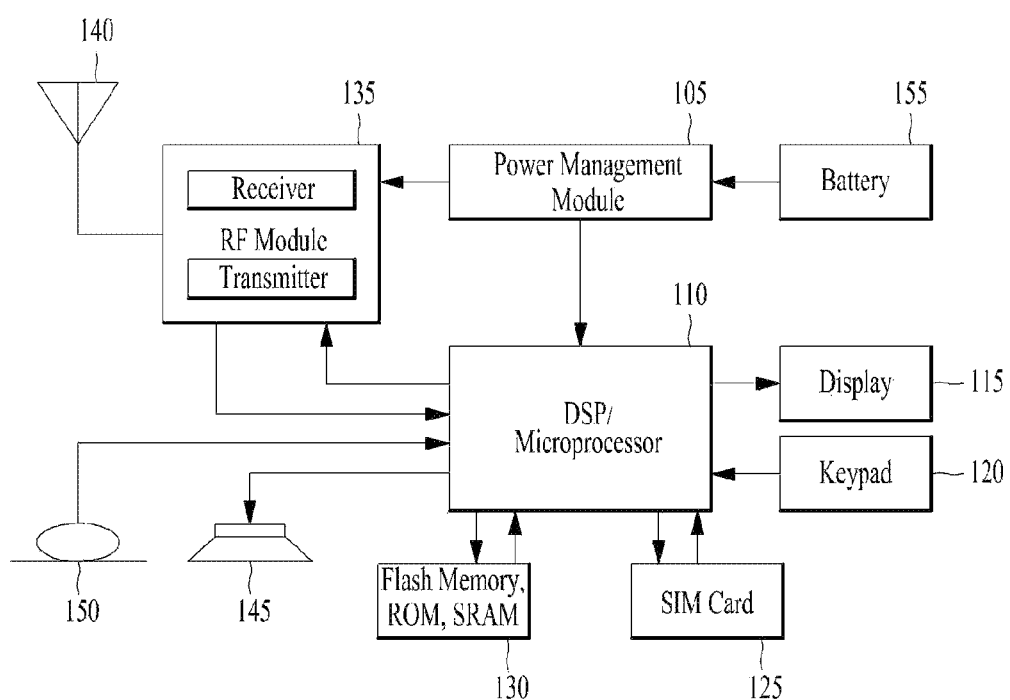
FIG. 6 is a block diagram of a communication apparatus according to an embodiment of the present invention.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 7A:
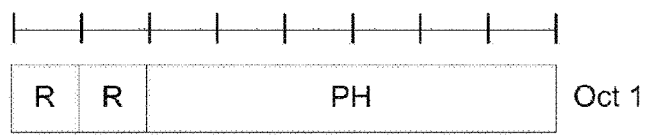
FIG. 7 is a diagram for signaling of power headroom reporting via a MAC CE.

FIG. 7 is a diagram for signaling of power headroom reporting via a MAC CE.

The amount of transmission power available in each UE is also relevant for the uplink scheduler. Obviously, there is little reason to schedule a higher data rate than the available transmission power can support. In the downlink, the available power is immediately known to the scheduler as the power amplifier is located in the same node as the scheduler. For the uplink, the power availability, or power headroom is defined as the difference between the nominal maximum output power and the estimated output power for UL-SCH transmission.

This quantity can be positive as well as negative (on a dB scale), where a negative value would indicate that the network has scheduled a higher data rate than the terminal can support given its current power availability. The power headroom depends on the power-control mechanism and thereby indirectly on factors such as the interference in the system and the distance to the base stations. Information about the power headroom is fed back from the terminals to the eNodeB in a similar way as the buffer-status reports—that is, only when the terminal is scheduled to transmit on the UL-SCH.

A Power Headroom Report (PHR) shall be triggered if any of the following events occur i) prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission; ii) periodicPHR-Timer expires; iii) upon configuration or reconfiguration of the power headroom reporting functionality by upper layers, which is not used to disable the function; iv) activation of an SCell of any MAC entity with configured uplink, v) addition of the PSCell, vi) prohibitPHR-Timer expires or has expired, when the MAC entity has UL resources for new transmission, and the following is true in this TTI for any of the activated Serving Cells of any MAC entity with configured uplink: there are UL resources allocated for transmission or there is a PUCCH transmission on this cell, and the required power backoff due to power management for this cell has changed more than dl-PathlossChange dB since the last transmission of a PHR when the MAC entity had UL resources allocated for transmission or PUCCH transmission on this cell.

It is also possible to configure a prohibit timer to control the minimum time between two power-headroom reports and thereby the signaling load on the uplink.

If the MAC entity has UL resources allocated for new transmission for this TTI the MAC entity shall start periodicPHR-Timer if it is the first UL resource allocated for a new transmission since the last MAC reset. If the Power Headroom reporting procedure determines that at least one PHR has been triggered and not cancelled, the MAC entity shall obtain the value of the Type 1 power headroom from the physical layer, and instruct the Multiplexing and Assembly procedure to generate and transmit a PHR MAC control element based on the value reported by the physical layer. And the MAC entity start or restart periodicPHR-Timer, start or restart prohibitPHR-Timer, and cancel all triggered PHR.

For the uplink transmission, the UE uses the PHR in order to provide the network with information about the difference between the nominal maximum transmit power and the estimated required transmit power. Thus, PHR indicates how much transmission power can be additionally used from the UE side.

In LTE, the Power Headroom Report (PHR) MAC control element is identified by a MAC PDU subheader with LCID as specified in Table 1. It has a fixed size and consists of a single octet defined as follows (FIG. 7*a*):

TABLE 1

| Index | LCID values |
|---|---|
| 00000 | CCCH |
| 00001-01010 | Identity of the logical channel |
| 01011 | CCCH |
| 01100 | CCCH |
| 01101-10011 | Reserved |
| 10100 | Recommended bit rate query |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

'R' is reserved bit, set to "0";

Power Headroom (PH) field indicates the power headroom level. The length of the field is 6 bits. The reported PH and the corresponding power headroom levels are shown in Table 2;

TABLE 2

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| . . . | . . . |
| 60 | POWER_HEADROOM_60 |
| 61 | POWER_HEADROOM_61 |
| 62 | POWER_HEADROOM_62 |
| 63 | POWER_HEADROOM_63 |

For extendedPHR, the Extended Power Headroom Report (PHR) MAC control element is identified by a MAC PDU subheader with LCID as specified in Table 1. It has a variable size and is defined in FIGS. 7b and 7c. When Type 2 PH is reported, the octet containing the Type 2 PH field is included first after the octet indicating the presence of PH per SCell and followed by an octet containing the associated $P_{CMAX,c}$ field (if reported). Then follows an octet with the Type 1 PH field and an octet with the associated $P_{CMAX,c}$ field (if reported), for the PCell. And then follows in ascending order based on the ServCellIndex an octet with the Type x PH field, wherein x is equal to 3 when the ul-Configuration-r14 is configured for this SCell (i.e., Sounding Reference Signal (SRS) is configured on the SCell), x is equal to 1 otherwise, and an octet with the associated $P_{CMAX,c}$ field (if reported), for each SCell indicated in the bitmap.

When the highest SCellIndex of SCell with configured uplink is less than 8, one octet with C fields is used for indicating the presence of PH per SCell (FIG. 7b), Otherwise, four octets are used (FIG. 7c).

The UE determines whether PH value for an activated Serving Cell is based on real transmission or a reference format by considering the downlink control information which has been received until and including the PDCCH occasion in which the first UL grant is received since a PHR has been triggered.

FIG. 7b is an example for Extended PHR MAC Control Elements with the highest SCellIndex of SCell with configured uplink is less than 8, and FIG. 7c is an example for Extended PHR MAC Control Elements with the highest SCellIndex of SCell with configured uplink is equal to or higher than 8.

The PHR MAC CEs are defined as follows:

'Ci field' indicates the presence of a PH field for the SCell with SCellIndex i. The Ci field set to "1" indicates that a PH field for the SCell with SCellIndex i is reported. The Ci field set to "0" indicates that a PH field for the SCell with SCellIndex i is not reported.

'V field' indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For Type 3 PH, V=0 indicates real transmission on SRS and V=1 indicates that an SRS reference format is used. Furthermore, for Type 1, Type 2, and Type 3 PH, V=0 indicates the presence of the octet containing the associated $P_{CMAX,c}$ field, and V=1 indicates that the octet containing the associated $P_{CMAX,c}$ field is omitted.

'PH field' indicates the power headroom level. The length of the field is 6 bits. The reported PH and the corresponding power headroom levels are shown in Table 2.

'P field' indicates whether the MAC entity applies power backoff due to power management. The MAC entity shall set P=1 if the corresponding $P_{CMAX,c}$ field would have had a different value if no power backoff due to power management had been applied.

$P_{CMAX,c}$: if present, this field indicates the $P_{CMAX,c}$ or $PP_{CMAX,c}$ used for calculation of the preceding PH field. The reported $P_{CMAX,c}$ and the corresponding nominal UE transmit power levels are shown in Table 3

TABLE 3

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

In NR, the Single Entry PHR MAC CE is identified by a MAC PDU subheader with LCID as specified in Table 4. It has a fixed size and consists of two octet defined as follows (FIG. 7d):

TABLE 4

| Index | LCID values |
|---|---|
| 000000 | CCCH |
| 000001-100000 | Identity of the logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

'R' is reserved bit, set to "0";

Power Headroom (PH) field indicates the power headroom level. The length of the field is 6 bits. The reported PH and the corresponding power headroom levels are shown in Table 5;

TABLE 5

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

$P_{CMAX,c}$ field indicates the $P_{CMAX,c}$ used for calculation of the preceding PH field. The reported $P_{CMAX,c}$ and the corresponding nominal UE transmit power levels are shown in Table 6.

TABLE 6

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

The Multiple Entry PHR MAC CE is identified by a MAC PDU subheader with LCID as specified in Table 4. It includes the bitmap, a Type 2 PH field and an octet containing the associated $P_{CMAX,c}$ field (if reported) for the PCell, a Type 2 PH field and an octet containing the associated $P_{CMAX,c}$ field (if reported) for either PSCell or PUCCH SCell, a Type 1 PH field and an octet containing the associated $P_{CMAX,c}$ field (if reported) for the PCell. It further includes, in ascending order based on the ServCellIndex, one or multiple of Type 1 PH fields and octets containing the associated $P_{CMAX,c}$ fields (if reported) for SCells indicated in the bitmap.

The presence of Type 2 PH field for PCell is configured by phr-Type2PCell, and the presence of Type 2 PH field for either PSCell or for PUCCH SCell is configured by phr-Type2OtherCell.

A single octet bitmap is used for indicating the presence of PH per SCell when the highest SCellIndex of SCell with configured uplink is less than 8, otherwise four octets are used.

The UE determines whether PH value for an activated Serving Cell is based on real transmission or a reference format by considering the downlink control information which has been received until and including the PDCCH occasion in which the first UL grant is received since a PHR has been triggered.

FIG. 7e is an example for Multiple Entry PHR MAC CE with the highest SCellIndex of SCell with configured uplink is less than 8, and FIG. 7f is an example for Multiple Entry PHR MAC CE with the highest SCellIndex of SCell with configured uplink is equal to or higher than 8.

The PHR MAC CEs are defined as follows:

'Ci field' indicates the presence of a PH field for the SCell with SCellIndex i. The Ci field set to "1" indicates that a PH field for the SCell with SCellIndex i is reported. The Ci field set to "0" indicates that a PH field for the SCell with SCellIndex i is not reported.

'V field' indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For Type 3 PH, V=0 indicates real transmission on SRS and V=1 indicates that an SRS reference format is used. Furthermore, for Type 1, Type 2, and Type 3 PH, V=0 indicates the presence of the octet containing the associated $P_{CMAX,c}$ field, and V=1 indicates that the octet containing the associated $P_{CMAX,c}$ field is omitted.

'PH field' indicates the power headroom level. The length of the field is 6 bits. The reported PH and the corresponding power headroom levels are shown in Table 2 (the corresponding measured values in dB for the NR Serving Cell are specified in TS 38.133 while the corresponding measured values in dB for the LTE Serving Cell are specified in TS 36.133).

'P field' indicates whether the MAC entity applies power backoff due to power management. The MAC entity shall set P=1 if the corresponding $P_{CMAX,c}$ field would have had a different value if no power backoff due to power management had been applied.

$P_{CMAX,c}$: if present, this field indicates the $P_{CMAX,c}$ or $PP_{CMAX,c}$ used for calculation of the preceding PH field. The reported $P_{CMAX,c}$ and the corresponding nominal UE transmit power levels are shown in Table 6 (the corresponding measured values in dB for the NR Serving Cell are specified in TS 38.133 while the corresponding measured values in dB for the LTE Serving Cell are specified in TS 36.133).

Figure 8:
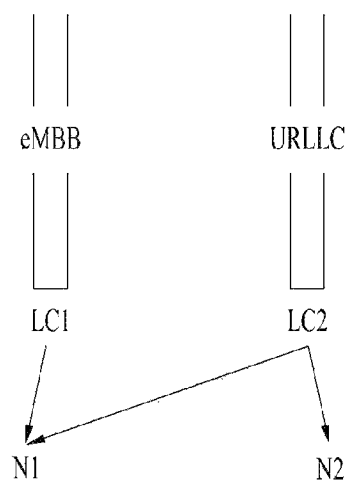
FIG. 8 is an example of mapping between Logical Channel and Numerology.

FIG. 8 is an example of mapping between logical channel and numerology.

In NR, there will be a mapping between a logical channel and numerology, where different logical channels can be mapped to the same numerology and one logical channel can be mapped to multiple numerologies.

The QoSs of different logical channels (services) are different. For example, URLLC has tighter latency requirement than eMBB. When a URLLC service triggers a SR, the required UL grant should be mapped to a numerology/TTI type with short latency. On the other side, for eMBB service, a UL grant with a numerology/TTI type of long latency is enough. The same principle applies to the periodical transmission as well as prohibition of SR. Recent RAN1 agreement to support short-periodicity SR can be used to help meet the UL scheduling latency requirements. A SR requiring a UL grant with a numerology/TTI type of short latency needs to have shorter SR periodicity and SR prohibit timer than that requiring a UL grant with a numerology/TTI type of long latency. Therefore, both SR periodicity and SR prohibit timer should be configured for each numerology/TTI type by network.

Meanwhile, in NR, multiple numerologies is to be used in order to enable flexible scheduling. For example, 30 kHz of subcarrier spacing allows more frequent scheduling within a subframe as the symbol length is decreased to 0.5 ms. Scheduling with different numerologies could be possible in TDM or FDM manner. If different numerologies are used for scheduling based on FDM manner, the radio condition may be different between numerologies.

In NR, RRC additionally controls the LCP procedure by configuring mapping restrictions for each logical channel:

allowedSCS-List which sets the allowed Subcarrier Spacing(s) for transmission maxPUSCH-Duration which sets the maximum PUSCH duration allowed for transmission configuredGrantType1Allowed which sets whether a configured grant Type 1 can be used for transmission allowedServingCells which sets the allowed cell(s) for transmission.

When a logical channel is configured to the UE by RRC signaling, one of combinations including allowedSCS-List, maxPUSCH-Duration, configuredGrantType1Allowed, and allowedServingCells is also configured with together.

The one of the combinations including allowedSCS-List, maxPUSCH-Duration, configuredGrantType1Allowed, and allowedServingCells is associated with a numerology of a logical channel that are configured with one the combinations.

Each fields of allowedSCS-List, maxPUSCH-Duration, configuredGrantType1Allowed, and allowedServingCells is included in LogicalChannelConfig message.

A 'allowedSCS-List' field indicates that: if present, UL MAC SDUs from this logical channel can only be mapped to the indicated numerology. Otherwise, UL MAC SDUs from this logical channel can be mapped to any configured numerology.

A 'maxPUSCH-Duration' field indicates that: if present, UL MAC SDUs from this logical channel can only be transmitted using uplink grants that result in a PUSCH duration shorter than or equal to the the duration indicated by this field. Otherwise, UL MAC SDUs from this logical channel can be transmitted using an uplink grant resulting in any PUSCH duration.

A 'configuredGrantType1Allowed' field indicates that: if present, UL MAC SDUs from this logical channel can be transmitted on a configured grant type 1.

A 'allowedServingCells' field indicates that: if present, UL MAC SDUs from this logical channel can only be mapped to the serving cells indicated in this list. Otherwise, UL MAC SDUs from this logical channel can be mapped to any configured serving cell of this cell group.

As each numerology may experience different radio condition, numerologies in NR may have an impact in Power Headroom Reporting (PHR). In using multiple numerologies, the factors impacting $P_{PUSCH,c}(i)$ may be different for different numerologies. For example, different numerologies may be allocated with different bandwidth of the PUSCH resource assignment.

Figure 9A:
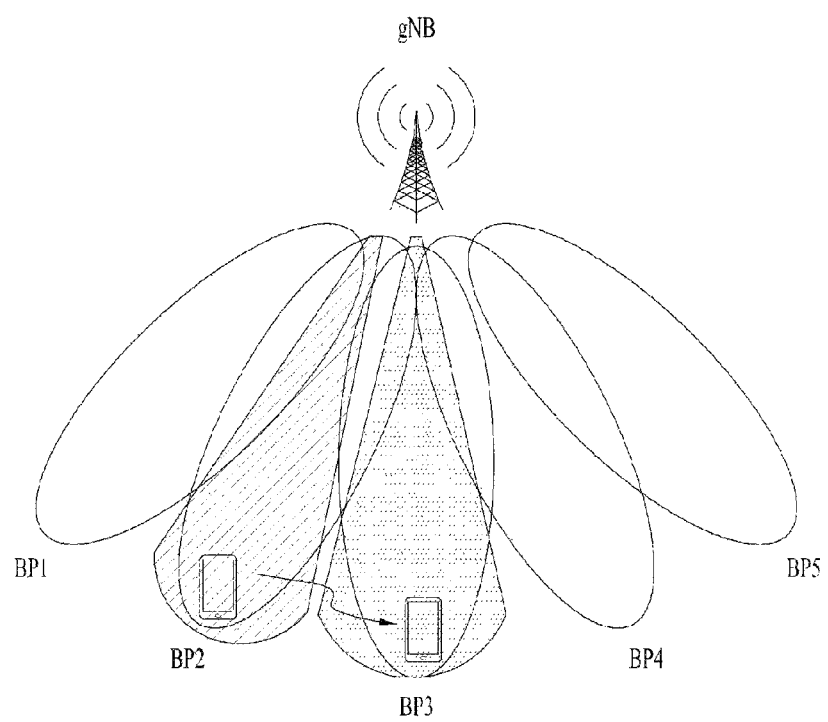
FIG. 9a is an example of UE with a single activated beam pair in multi-beam operation.
Figure 9B:
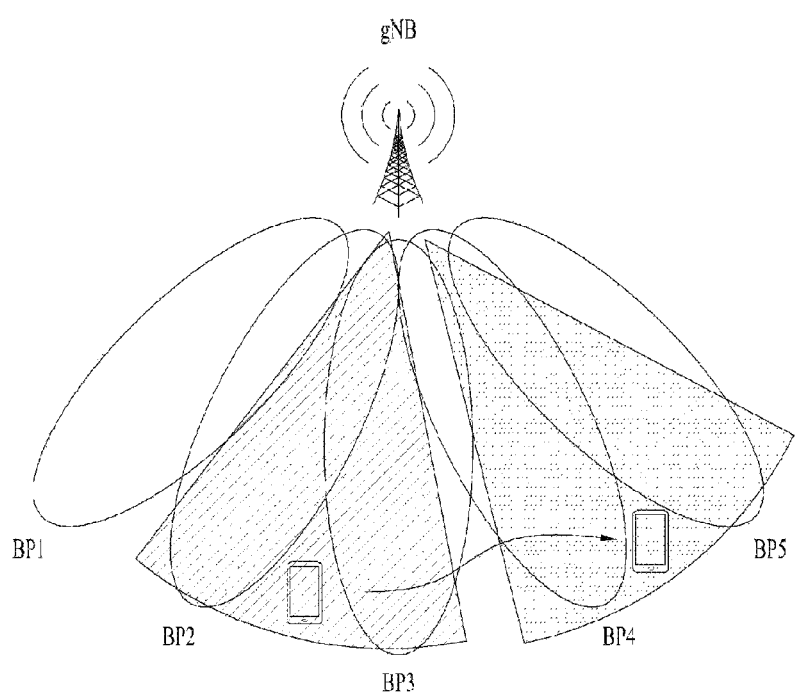
FIG. 9b is an example of the UE with two activated beam pairs in multi-beam operation.

FIG. 9a is an example of UE with a single activated beam pair in multi-beam operation, and FIG. 9b is an example of the UE with two activated beam pairs in multi-beam operation.

In NR, beam forming is deemed a key technology in order to compensate for a large path-loss. By using multiple antenna arrays, multiple narrow beams with higher antenna gain could cover similar level of cell coverage even on high frequency band.

In previous meeting, RAN agreed to support beam specific power control as a baseline. If a UE transmits data using a single activated UL beam pair in multi-beam operation as shown in FIG. 9a where a beam pair comprises a UE Tx beam and a gNB Rx beam, the UE can generate PHR including PH information derived from the specific beam pair link and the PH information will be transmitted per serving cell like as LTE.

However, the narrow beam has the weakness that link quality can suddenly change depending on the UE movement or the blockage. Accordingly, in order to improve the link robustness, RAN agreed that UE should be able to maintain links with multiple DL beam pairs of one cell between multiple TRPs and the UE as described in FIG. 9b where a DL beam pair link comprises a UE Rx beam and a gNB Tx beam and RAN is also under discussion on the multi-beam UL transmission.

If the UE can also send data via multiple UL beam pair links for UL robustness, the power control factors impacting PH value in PHR may be different for different beams. Since different beams may experience different downlink path loss, for accurate power control, it will be useful to report PH information for all activated UL beam pairs. However, transmitting one or more PH(s) information for all activated beam pairs increases the MAC CE overhead of PHR. Considering the number of both configured/activated beams and serving cells, this wouldn't be desirable.

In LTE, a PHR is used to inform the eNB of power situation of the UE so that the eNB can decide whether to allocate more resources to the UE or not. To allocate suitable resources for a UE, the eNB receives PHR regularly and reflects the changes in path loss. However, since the frequent PHR transmission leads to the signaling overhead, LTE triggers the PHR based on the prohibit_PHR_timer and periodic_PHR_timer.

In NR, a PHR should be designed based on the legacy parameters taking into account new feature. However, we think that the path loss change for different beams can be covered with the legacy PHR in spite of multi-beam operation. In addition, if the PHR is triggered every beam changes, the signalling overhead will increase even more due to the frequent beam change in the narrow beam scenario.

In this case, for accurate power control, it may be necessary for the UE to report PH for each beam or for each numerology. However, it increases the signaling overhead of PHR as PHR includes PH information for each beam and each numerology. Considering the possible number of beam or numerology, this wouldn't be desirable. Therefore, a new mechanism that allows the gNB to estimate the UE's power situation in multiple beam/numerology is needed.

Figure 10:
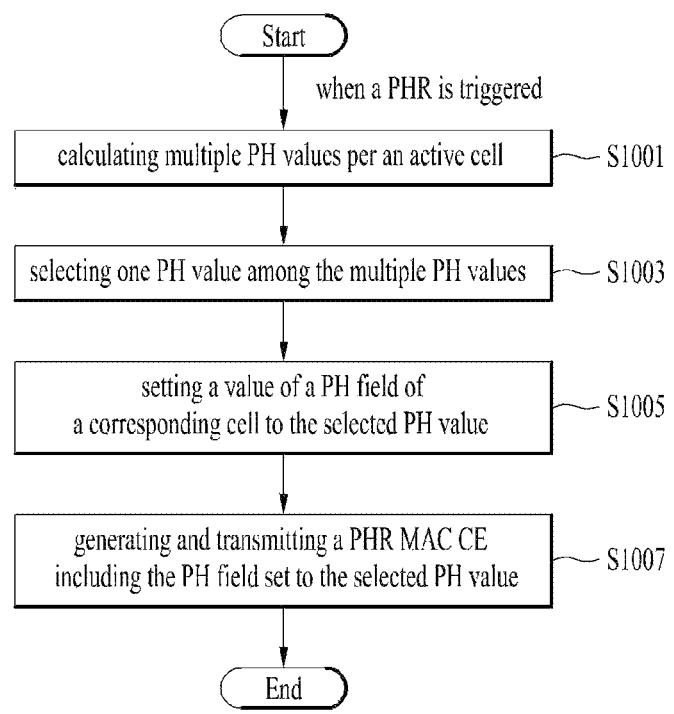
FIG. 10 is a conceptual diagram for transmitting a power headroom reporting in wireless communication system according to embodiments of the present invention.

FIG. 10 is a conceptual diagram for transmitting a power headroom reporting in wireless communication system according to embodiments of the present invention.

In this invention, when a UE performs a Power Headroom Reporting (PHR), the UE selects one Power Headroom (PH) value among multiple PH values where each of the multiple PH values corresponds to each beam, each numerology or each carrier. The UE generates a PHR MAC Control Element (CE) including the selected PH value and sends the generated PHR MAC CE to a network (e.g., eNB or gNB).

When the UE is configured to operate with multiple beams or numerologies or carriers by a network, the UE calculates multiple Power Headroom (PH) values per an active cell when the UE triggers a PHR based on the PHR trigger event (S1001).

A Power Headroom Report (PHR) shall be triggered if any of the following events occur i) prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission; ii) periodicPHR-Timer expires; iii) upon configuration or reconfiguration of the power headroom reporting functionality by upper layers, which is not used to disable the function; iv) activation of an SCell of any MAC entity with configured uplink, v) addition of the PSCell, vi) prohibitPHR-Timer expires or has expired, when the MAC entity has UL resources for new transmission, and the following is true in this TTI for any of the activated Serving Cells of any MAC entity with configured uplink: there are UL resources allocated for transmission or there is a PUCCH transmission on this cell, and the required power backoff due to power management for this cell has changed more than dl-PathlossChange dB since the last transmission of a PHR when the MAC entity had UL resources allocated for transmission or PUCCH transmission on this cell.

Preferably, in this invention, the beam refers to a receiving beam from the gNB side, or transmitting beam from the UE side.

In order to the UE generates a PHR MAC CE, the UE calculates a PH value for each beam/numerology. And among multiple PH values for multiple beams/numerologies, the UE selects one PH value (S1003).

Calculation of the PH values for multiple beams/numerologies can be performed by PHY layer of the UE. After PHY layer calculates the PH values, the selection of one PH value among the multiple PH values can be performed either by the PHY layer or the MAC layer.

For example, a PHY layer calculates the PH values for multiple beams/numerologies, selects one PH value, and delivers only the selected PH value to MAC layer, or the PHY layer calculates the PH values for multiple beams/numerologies and delivers all calculated PH values to MAC layers. MAC layer selects one PH value.

When the PHY layer delivers a PH value to the MAC layer, the PHY layer may deliver the beam/numerology information corresponding to the PH value together with the PH value to MAC layer.

If the UE is configured with multiple carriers, for each activated cell, the UE selects one PH value. In other words, the UE selects multiple PH values, where each of the multiple PH values corresponds to each cell.

Preferably, the one PH value which is selected among the multiple PH values is one of followings:

a smallest PH value among the multiple PH values, or a largest PH value among the multiple PH values, or a PH value corresponding to a specific beam/numerology, which is indicated or pre-determined by the network, or a PH value corresponding to a beam/numerology with the worst radio channel condition, or a PH value corresponding to a beam/numerology with the best radio channel condition, or a PH value corresponding to a numerology with the shortest Transmission Time Interval (TTI) duration.

When the UE selects one PH value, the UE sets a value of a PH field of a corresponding cell to the selected PH value (S1005) for generating a Power Headroom Reporting (PHR) Medium Access Control (MAC) Control Element (CE).

The UE may include the beam/numerology information corresponding to the selected PH value in the PHR MAC CE.

And then, the UE generates the PHR MAC CE including the PH field set to the selected PH value, and transmits a MAC Protocol Data Unit (PDU) including the generated PHR MAC CE to the network (S1007).

Meanwhile, the network receives the PHR MAC CE including the selected PH value, the gNB considers that the PH value is indicating a power headroom of one beam/numerology among multiple beams/numerologies.

FIGS. 11a and 11b are examples for transmitting a power headroom reporting in wireless communication system according to embodiments of the present invention.

According to our invention, if a UE is operating with multiple beams, when the UE performs a Power Headroom Reporting (PHR), the UE selects one Power Headroom (PH) value among multiple PH values where each of the multiple PH values corresponds to each of the multiple beams. The UE generates a PHR MAC Control Element (CE) including the selected PH value and sends the generated PHR MAC CE to a gNB.

For example, it is assumed that the UE is operating with 5 beams for a SCell 1, i.e., Beam1, 2, 3, 4, and 5, and the UE selects the smallest PH value in the multi-beam operation.

When the UE triggers a PHR, the UE calculates the PH values for all beams for the SCell 1, i.e., PH1, 2, 3, 4, and 5 where PH1>PH2>PH3>PH4>PH5. Since the UE selects the smallest PH value among PH1, 2, 3, 4, and 5, so, the UE selects PH5. The UE generates a PHR MAC CE including PH for the SCell 1 set to PH5, and sends the generated PHR MAC CE to the gNB, as shown in FIG. 11a.

Or, if a UE is operating with multiple numerologies, when the UE performs a Power Headroom Reporting (PHR), the UE selects one Power Headroom (PH) value among multiple PH values where each of the multiple PH values corresponds to each of the multiple numerologies. The UE generates a PHR MAC Control Element (CE) including the selected PH value and sends the generated PHR MAC CE to a gNB.

For example, it is assumed that the UE is operating with 3 numerologies for a SCell 2, i.e., numerology 1, 2, and 3, and the UE selects the largest PH value in the multi-beam operation.

When the UE triggers a PHR, the UE calculates the PH values for all numerologies for the SCell 2, i.e., PH1, 2, and 3 where PH1>PH2>PH3. Since the UE selects the largest PH value among PH1, 2, and 3, so, the UE selects PH1. The UE generates a PHR MAC CE including PH for the SCell 2 set to PH1, and sends the generated PHR MAC CE to the gNB, as shown in FIG. 11b.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NRsystem.

The invention claimed is:

1. A method performed by a User Equipment (UE) operating in a wireless communication system, the method comprising:

triggering a Power Headroom Reporting (PHR) based on a PHR trigger event;
calculating, based on the triggered PHR, multiple Power Headroom (PH) values for multiple numerologies per an active cell;
selecting one PH value among the multiple PH values for setting a value of a PH field of a corresponding cell to the selected PH value;
generating a PHR Medium Access Control (MAC) Control Element (CE) including the PH field set to the selected PH value; and
transmitting a MAC Protocol Data Unit (PDU) including the generated PHR MAC CE to a network,
wherein the one PH value is selected based on a PH value corresponding to a numerology with the best radio channel condition.

2. The method according to claim 1, wherein the PHR trigger event is one of:
an event related to expiration of prohibitPHR-Timer, or
an event related to configuration or reconfiguration of PHR functionality, or
an event related to activation of an SCell of any MAC entity with configured uplink, or
an event related to addition of a PSCell.

3. The method according to claim 1, wherein the PHR MAC CE includes a field indicating numerology information corresponding to the selected PH value.

4. A User Equipment (UE) for operating in a wireless communication system, the UE comprising:
a Radio Frequency (RF) module; and
a processor operably coupled with the RF module and configured to:
trigger a Power Headroom Reporting (PHR) based on a PHR trigger event;
calculate, based on the triggered PHR, multiple Power Headroom (PH) values for multiple numerologies per an active cell,
select one PH value among the multiple PH values for setting a value of a PH field of a corresponding cell to the selected PH value,
generate a PHR Medium Access Control (MAC) Control Element (CE) including the PH field set to the selected PH value, and
transmit a MAC Protocol Data Unit (PDU) including the generated PHR MAC CE to a network,
wherein the one PH value is selected based on a PH value corresponding to a numerology with the best radio channel condition.

5. The UE according to claim 4, wherein the PHR trigger event is one of:
an event related to expiration of prohibitPHR-Timer; or
an event related to configuration or reconfiguration of PHR functionality; or
an event related to activation of an SCell of any MAC entity with configured uplink; or
an event related to addition of a PSCell.

6. The UE according to claim 4, wherein the PHR MAC CE includes a field indicating numerology information corresponding to the selected PH value.

* * * * *